(12) United States Patent
Kim et al.

(10) Patent No.: US 9,093,677 B2
(45) Date of Patent: Jul. 28, 2015

(54) APPARATUS AND METHOD FOR MANAGING STATIONARY FUEL CELL SYSTEM

(71) Applicant: Korea Institute of Energy Research, Daejeon (KR)

(72) Inventors: Min Jin Kim, Daejeon (KR); Young-Jun Sohn, Daejeon (KR); Gu-Gon Park, Daejeon (KR); Byung Chan Bae, Seoul (KR); Sung-Dae Yim, Daejeon (KR); Young-Woo Choi, Cheongju-si (KR); Seok-Hee Park, Daejeon (KR); Young-Gi Yoon, Daejeon (KR); Tae-Hyun Yang, Daejeon (KR); Won-Yong Lee, Daejeon (KR); Chang-Soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 131 days.

(21) Appl. No.: 14/028,160

(22) Filed: Sep. 16, 2013

(65) Prior Publication Data

US 2014/0080023 A1 Mar. 20, 2014

(30) Foreign Application Priority Data

Sep. 17, 2012 (KR) .................. 10-2012-0103043
Sep. 17, 2012 (KR) .................. 10-2012-0103045
Sep. 17, 2012 (KR) .................. 10-2012-0103046

(51) Int. Cl.
*H01M 8/04* (2006.01)

(52) U.S. Cl.
CPC ........ *H01M 8/04544* (2013.01); *H01M 8/0438* (2013.01); *H01M 8/04298* (2013.01); *H01M 8/04365* (2013.01); *H01M 8/04388* (2013.01); *H01M 8/04492* (2013.01); *H01M 8/04574* (2013.01); *H01M 8/04619* (2013.01); *H01M 8/04992* (2013.01); *H01M 8/04313* (2013.01); *H01M 2250/20* (2013.01); *Y02E 60/50* (2013.01)

(58) Field of Classification Search
CPC .............. H01M 8/04; H01M 8/04544; H01M 8/04574; Y02E 60/50
See application file for complete search history.

(56) References Cited

U.S. PATENT DOCUMENTS

| 7,767,328 B2 | 8/2010 | Kobayashi et al. |
| 2006/0029844 A1 * | 2/2006 | Kobayashi et al. ............. 429/23 |

FOREIGN PATENT DOCUMENTS

| JP | 2001102063 A | 4/2001 |
| JP | 2002190308 A | 7/2002 |
| JP | 2005160238 A | 6/2005 |
| KR | 1020020081296 A | 10/2002 |

(Continued)

OTHER PUBLICATIONS

Lee et al., "Operating control of fuel cell hybrid vehicles" Aug. 18, 2006, pp. 143-154.

(Continued)

*Primary Examiner* — Patrick Ryan
*Assistant Examiner* — Ben Lewis
(74) *Attorney, Agent, or Firm* — The Webb Law Firm

(57) ABSTRACT

Provided are an apparatus and a method for managing a stationary fuel cell system, and more particularly, an apparatus and a method for managing a stationary fuel cell system capable of optimally maintaining a driving method based on environmental information and product information.

19 Claims, 8 Drawing Sheets

(56) References Cited

FOREIGN PATENT DOCUMENTS

| | | |
|---|---|---|
| KR | 1020040111707 A | 12/2004 |
| KR | 1020110029501 A | 3/2011 |
| KR | 1020120008353 A | 1/2012 |

OTHER PUBLICATIONS

Ji et al., "Development of a performance model for PEMFC according to operating conditions" May 19, 2011, pp. 2334-2338 (English-language Abstract attached).

* cited by examiner

APPARATUS AND METHOD FOR MANAGING STATIONARY FUEL CELL SYSTEM

CROSS-REFERENCE TO RELATED APPLICATIONS

This application claims priority under 35 U.S.C. §119 to Korean Patent Application No. 10-2012-0103043, filed on Sep. 17, 2013, Korean Patent Application No. 10-2012-0103045, filed on Sep. 17, 2013, and Korean Patent Application No. 10-2012-0103046, filed on Sep. 17, 2013 in the Korean Intellectual Property Office, the disclosure of which is incorporated herein by reference in its entirety.

TECHNICAL FIELD

The present invention relates to an apparatus and a method for managing a stationary fuel cell system, and more particularly, to an apparatus and a method for managing a stationary fuel cell vehicle system capable of optimally maintaining a driving method based on environmental information and product information.

BACKGROUND

Fossil fuel reserves are very restricted, and thus the depletion of the fossil fuel is inevitable. In particular, since main emission sources of greenhouse gas causing global warming are fuel reserves, advanced countries have been focused on developing hydrogen energy, and the like, using alternative energy or atomic energy so as to decrease fossil fuels. An example of energy sources which have emerged as alternative energy may include solar energy, wind power, hydrogen energy, biomass, and the like. To use solar power or wind power, auxiliary facilities, such as a solar panel and a windmill, are required. However, since a wide space is required to install the solar panel or the windmill, other environmental problems, such as destruction of ecosystem and noise, may occur. Future energy needs requirements, such as environmental acceptability, economic productibility, and eternal capability.

A fuel cell is a cell which directly converts chemical energy generated by oxidation into electrical energy and is a new eco-friendly future energy technology of generating electrical energy from materials, which richly exist on earth, such as hydrogen and oxygen.

The fuel cell performs an electrochemical reaction in an electrolysis reverse reaction type of water by supplying oxygen to a cathode and hydrogen to an anode to produce electricity, heat, and water, thereby generating electrical energy at high efficiency without inducing pollutants.

The fuel cell which produces electricity and heat using fuel such as city gas is a representative new growth engine industry which has a greenhouse gas reduction effect and a very large job creation effect, and therefore is positively being promoted and commercialized around the world.

The fuel cell may generate electricity and hot water and save light and heat expenses of homes, and help prevent global worming prevention.

When the fuel cell is installed in the home, a consumer may save energy expenses and a house may be become eco-friendly which increases a market value of a house. Presently, government agencies hope to decrease greenhouse gas emission by 30% or more using the present invention, instead of using the existing power generation methods. Despite these advantages, a domestic fuel cell has been actively promoted in the country. However, fuel cells are not commonly considered because it still relatively unknown, and a product price is still expensive. Nevertheless, there is no doubt that it is essential to commercialize the fuel cell in respect to environmental impact or for the future.

One alternative to a problem of a supply of electricity on earth is a renewable distributed energy generation (RDEG) technology. The RDEG technology may produce power at a consumption place and may reduce a construction of high-cost, inefficient transmission and distribution networks. The RDEG technology minimally emits greenhouse gas during the production of power. The technology has the potential to minimize complexity that occur due to centralized energy resources while allowing a consumer to be able to have more control and quick response, save costs, and the like. However, the RDEG technology has not yet been firmly established as a marketable entity. For this reason, a government directly subsidizes the RDEG technology in order to assist in the commercialization.

The RDEG technology is configured of three main technologies, that is, solar power, small wind power, a fuel cell. Reviewing in detail a power market, the RDEG technology occupies only a tiny fraction of all the power generation sources.

A stationary fuel cell has a huge potential for future use. The stationary fuel cell corresponds to a clean, efficient power supply and may have generation capacity from 1 kw to 10 MW. The fuel cell may use the existing or accessible fuel like natural gas thanks to technology innovation and may use other fuels including bio fuels and gas which are byproducts generated during adjacent industrial processes. When the fuel cell is coupled with a combined heat & power plant, efficiency may be remarkably increased from about 40 to 50% to about 85%. However, it is difficult to forecast the long-term potential of the technology due to a cost problem. To reduce cost, it is necessary to increase a scale. However, in order to increase the scale, it is essential to greatly decrease cost. Without the continuous support program by the government, it is impossible to figure out whether the technology reaches a success critical point and when it will.

For commercialization of the stationary fuel cell, there are many problems to be solved, such as a method for manufacturing a stationary fuel cell at a reasonable price, a development of a stationary fuel cell system having high efficiency, and the like. Among them, many methods of increasing efficiency of a stationary fuel cell system have been researched.

U.S. Pat. No. 7,767,328 discloses a system of tracking an optimal operation point of a fuel cell in a power supply device using a fuel cell and a power supply device including the system of tracking an optimal operation point of a fuel cell.

RELATED ART DOCUMENT

Patent Document

U.S. Pat. No. 7,767,328

SUMMARY

An embodiment of the present invention is directed to providing an apparatus and a method for managing a stationary fuel cell system capable of predicting performance, efficiency, and lifespan of components based on product information and optimally maintaining driving conditions based on environmental information.

In one general aspect, there is provided an apparatus for managing a stationary fuel cell system, including: a connection unit 100 which is detachably connected to a control unit of a stationary fuel cell system 70; a collection unit 200 which is connected to the connection unit 100 to receive data of the stationary fuel cell system 70; a calculation unit 300 which is connected to the collection unit 200 to determine a method for controlling the stationary fuel cell system 70 based on the received data; and a control unit 400 which is connected to the calculation unit 300 and the connection unit 100 to control the stationary fuel cell system 70 on the basis of the control method determined by the calculation unit 300, wherein the connection unit 100 is directly connected to the control unit of the stationary fuel cell system 70 and the collection unit 200 and the control unit are connected to each other by a cable.

The collection unit 200 may collect at least one information selected from a flow rate of fuel supplied to a reformer, a flow rate of fuel supplied to a burner for the reformer, a voltage of the stationary fuel cell, a current for a stationary fuel cell, a flow rate of fuel supplied to a fuel conversion system, power of the stationary fuel cell, temperature of the stationary fuel cell, pressure of the stationary fuel cell, a fuel and oxidizing agent use rate of the stationary fuel cell, humidity of the stationary fuel cell, a total power consumption of a balance of plant (BOP) of the stationary fuel cell, efficiency of DC/DC converter, efficiency of a DC/AC inverter device, a flow rate of a heat recovery fluid, water enthalpy of temperature of a hot water inlet, water enthalpy of temperature of a hot water outlet, an NG flow rate used in a home or a building as a usage other than the fuel cell, and an electric load quantity required in a home or a building.

The calculation unit 300 may include: a prediction unit 310 which is connected to the collection unit 200 to predict the performance of the stationary fuel cell system 70 based on the received data; and a determination unit 320 which is connected to the prediction unit 310 to determine a method for driving the stationary fuel cell system 70 based on the performance of the stationary fuel cell system 70, previously determined environmental information, and a previously determined driving purpose.

The determination unit 320 may include: a product performance collection unit 321 which is connected to the prediction unit 310 to receive performance of the stationary fuel cell system 70; an environmental information collection unit 322 which is connected to an external input device to receive at least one environmental information selected from fuel cost, electric cost, a fuel heating value, fuel composition information, a discount rate of the fuel cost, a support fund for the fuel cost, and a fuel fare system; a control method collection unit 323 which is connected to the external input device to receive a driving purpose; and a driving method calculation unit 324 which is connected to the product performance collection unit 321, the environmental information collection unit 322, and the control method collection unit 323 to calculate the method for driving a stationary fuel cell system 70 based on the performance, the environmental information, and the driving purpose of the stationary fuel cell system 70.

The apparatus 1000 for managing a stationary fuel cell system may further include: a display and control unit 500 which is connected to the calculation unit 300, inputs the environmental information and the driving purpose to the calculation unit 300, and outputs the input environmental information and driving purpose.

The display and control unit 500 may be included in a managing unit which manages the stationary fuel cell system 70.

The driving purpose of the display and control unit 500 may be at least any one selected from electrical efficiency, heat efficiency, summing efficiency of electricity and heat, LNG operating cost efficiency, power operating cost efficiency, and summing efficiency of LNG operating cost and power operating cost.

The apparatus 1000 for managing a stationary fuel cell system may further include: a power supply unit 600 which includes a battery for supplying power to supply power to the apparatus 1000 for managing a stationary fuel cell system.

The apparatus 1000 for managing a stationary fuel cell system may further include: a data storage unit 700 which is connected to the calculation unit 300 to store all the data; and a fuel cell analysis unit 800 which is connected to the data storage unit 700 to analyze the stationary fuel cell system 70 so as to estimate characteristics of the stationary fuel cell system 70.

In another general aspect, there is provided a method for managing a stationary fuel cell system of an apparatus 1000 for a stationary fuel cell system including a connection unit 100 which is detachably connected to a control unit of a stationary fuel cell system 70, a collection unit 200, a calculation unit 300, and a control unit 400, the method including: inputting product information to the collection unit 200 through the connection unit and inputting environmental information to the calculation unit 300 connected to an external input device (S10); determining, by the calculation unit 300, a method for controlling the stationary fuel cell system 70 to increase driving efficiency or decrease driving cost by calculating a driving method depending on at least any one driving purpose selected from driving having electrical efficiency, driving having high heat efficiency, and driving having high overall efficiency which is a sum of the electrical efficiency and the heat efficiency or at least any one driving purpose selected from driving having low fuel used cost, driving having low electricity use cost, and driving having overall cost which is a sum of the fuel use cost and the electricity use cost, based on the product information and the environmental information input in the inputting of the information (S20); and controlling, by the control unit 400, the stationary fuel cell system 70 on the basis of the control method determined by the determining of the control method (S30).

The product information of the inputting of the information (S10) may be least one information selected from the flow rate of fuel supplied to the reformer, the flow rate of fuel supplied to the burner for the reformer, the voltage of the stationary fuel cell, the current for the stationary fuel cell, the flow rate of fuel supplied to the fuel conversion system, the power of the stationary fuel cell, the temperature of the stationary fuel cell, the pressure of the stationary fuel cell, the fuel and oxidizing agent use rate of the stationary fuel cell, the humidity of the stationary fuel cell, the total power consumption of the balance of plant (BOP) of the stationary fuel cell, the efficiency of DC/DC converter, the efficiency of the DC/AC inverter device, the flow rate of a heat recovery fluid, the water enthalpy of temperature of the hot water inlet, the water enthalpy of temperature of the hot water outlet, the NG flow rate used in a home or a building as a usage other than the fuel cell, and the electric load quantity required in a home or a building and the environmental information of the inputting of the information (S10) may be at least any one selected from the fuel cost, the fuel heating value, the fuel composition information, the electric cost, the discount rate of the fuel cost, the support fund for the fuel cost, and the fuel fare system.

The driving having high electrical efficiency may be driving having highest electrical efficiency based on the following Formula.

$$\eta_P = \frac{3600 \times \left(W_{stack} - \frac{W_{BOP}}{E_{cov}}\right)E_{inv}}{F_{NG\text{-}in} \times K}$$

($\eta_p$ represents the electrical efficiency, $W_{stack}$ represents electric output (voltage×current) generated from the stationary fuel cell stack, $W_{BOP}$ represents a sum of the electric output (voltage×current) consumed from the balance of plant (BOP), $E_{cov}$ represents the efficiency of the DC/DC converter, $E_{inv}$ represents the efficiency of the DC/AC inverter, $F_{NG\text{-}in}$ represents the flow rate of fuel supplied to the fuel conversion system, and K represents the fuel heating value).

The driving having high heat efficiency may be driving having highest heat efficiency based on the following Formula.

$$\eta_h = \frac{(i_2 - i_1)Q}{F_{NH\text{-}in} \times K}$$

($\eta_h$ represents the heat efficiency, Q represents the flow rate of the heat recovery fluid, $i_1$ represents the water enthalpy of the temperature of the hot water inlet, $i_2$ represents the water enthalpy of the temperature of the hot water outlet, $F_{NG\text{-}in}$ represents the flow rate of the fuel supplied to the fuel conversion system, and K represents the fuel heating value).

The driving having overall efficiency may be driving having highest overall efficiency based on the following Formula.

$$\eta_{sfc} = \frac{\left(3600 \times \left(W_{stack} - \frac{W_{BOP}}{E_{cov}}\right)E_{inv}\right) + ((i_2 - i_1)Q)}{F_{NG\text{-}in} \times K}$$

($\eta_{sfc}$ represents the overall efficiency, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{inv}$ represents the efficiency of the DC/AC inverter, Q represents the flow rate of the heat recovery fluid, $i_1$ represents the water enthalpy of the temperature of the hot water inlet, $i_2$ represents the water enthalpy of the temperature of the hot water outlet, $F_{NG\text{-}in}$ represents the flow rate of fuel supplied to the fuel conversion system, and K represents the fuel heating value).

The driving having fuel use cost may be driving having lowest fuel use cost based on the following Formula.

$$C_{NG\text{-}in} = UC_{NG}(F_{NG\text{-}1} + F_{NG\text{-}in})$$

($C_{NG\text{-}in}$ represents the fuel use cost, $UC_{NG}$ represents the fuel cost, $F_{NG\text{-}1}$ represents the flow rate of fuel used as the usage other than the stationary fuel cell, and $F_{NG\text{-}in}$ represents the flow rate of fuel supplied to the fuel conversion system).

The driving having electricity use cost may be driving having lowest electricity use cost based on the following Formula.

$$C_p = UC_p \times \left(W_1 - \left(W_{stack} - \frac{W_{BOP}}{E_{cov}}\right)E_{inv}\right)$$

($C_p$ represents the electricity use cost, $UC_p$ represents the electric cost, $W_1$ represents the electric load used as a usage other than the stationary fuel cell, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, and $E_{inv}$ represents the efficiency of the DC/AC inverter).

The driving having overall cost may be driving having lowest overall cost based on the following Formula.

$$C_{sfc} = \left(UC_p \times \left(W_1 - \left(W_{stack} - \frac{W_{BOP}}{E_{cov}}\right)E_{inv}\right)\right) + (UC_{NG}(F_{NG\text{-}1} + F_{NG\text{-}in}))$$

($C_{sfc}$ represents the overall cost, $UC_p$ represents the electric cost, $W_1$ represents the electric load used as a usage other than the stationary fuel cell, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{inv}$ represents the efficiency of the DC/AC inverter, $UC_{NG}$ represents the fuel cost, $F_{NG\text{-}1}$ represents the flow rate of fuel used as the usage other than the stationary fuel cell, and $F_{NG\text{-}in}$ represents the flow rate of fuel supplied to the fuel conversion system).

The determining of the control method (S20) may include: predicting the performance of the stationary fuel cell system 70 based on the product information input from the inputting of the information (S10) (S21); calculating the driving method depending on at least one driving condition based on the performance of the stationary fuel cell system 70 predicted in the predicting of the performance (S21) and the environmental information input in the inputting of the information (S23); and determining at least one of the driving methods calculated in the calculating of the driving method (S23) (S24).

The determining of the control method (S20) may include: predicting the performance of the stationary fuel cell system 70 based on the product information input in the inputting of the information (S10) (S21); selecting and inputting a driving purpose using an external input device (S22); and calculating the driving method based on the performance of the stationary fuel cell system 70 predicted in the predicting of the performance (S21), the environmental information input in the inputting of the information (S10), and the driving purpose input in the inputting of the driving purpose (S22) (S23).

DETAILED DESCRIPTION OF MAIN ELEMENTS

50: STATIONARY FUEL CELL MODULE
51: STATIONARY FUEL CELL STACK
52: DC/DC CONVERTER
53: DC/AC INVERTER
54: BALANCE OF PLANT (BOP)
60: FUEL CONVERSION SYSTEM
61: REFORMER
62: BURNER
70: STATIONARY FUEL CELL SYSTEM
1000: APPARATUS FOR MANAGING STATIONARY FUEL CELL SYSTEM
100: CONNECTION UNIT
200: COLLECTION UNIT
300: CALCULATION UNIT
310: PREDICTION UNIT
320: DETERMINATION UNIT
321: PRODUCT PERFORMANCE COLLECTION UNIT
322: ENVIRONMENTAL INFORMATION COLLECTION UNIT
323: CONTROL METHOD COLLECTION UNIT
324: DRIVING METHOD CALCULATION UNIT
400: CONTROL UNIT
500: DISPLAY AND CONTROL UNIT
600: POWER SUPPLY UNIT
S10: INPUTTING INFORMATION
S20: DETERMINING CONTROL METHOD
S21: PREDICTING PERFORMANCE
S22: INPUTTING DRIVING PURPOSE
S23: CALCULATING DRIVING METHOD
S24: DETERMINING DRIVING METHOD
S30: CONTROLLING

DETAILED DESCRIPTION OF EMBODIMENTS

Hereinafter, an apparatus for managing a stationary fuel cell system according to an exemplary embodiment of the present invention will be described in detail with reference to the accompanying drawings.

Figure 1:
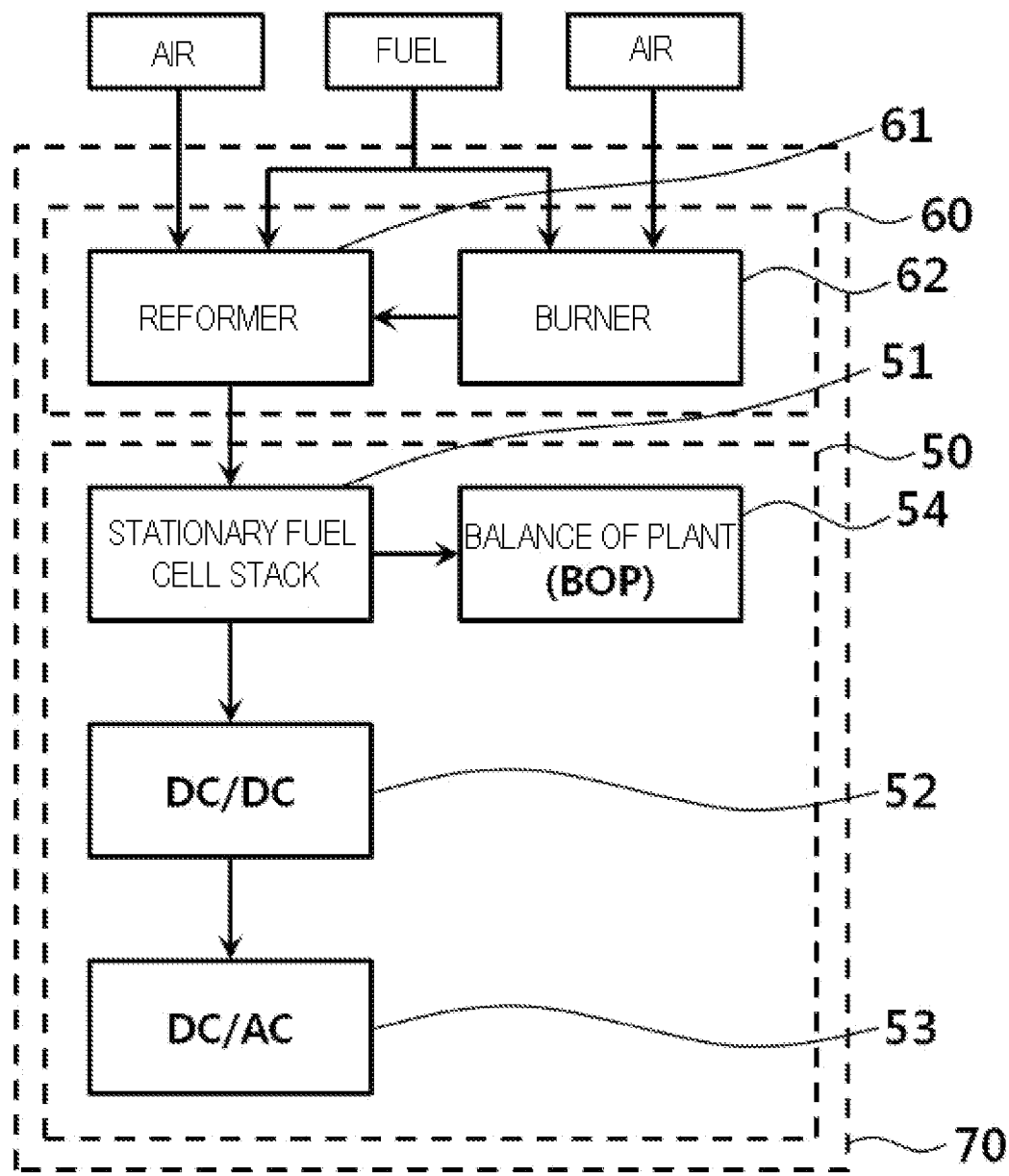
FIG. 1 is a conceptual diagram of a fuel cell system used by reforming fuel according to the related art.
Figure 2:
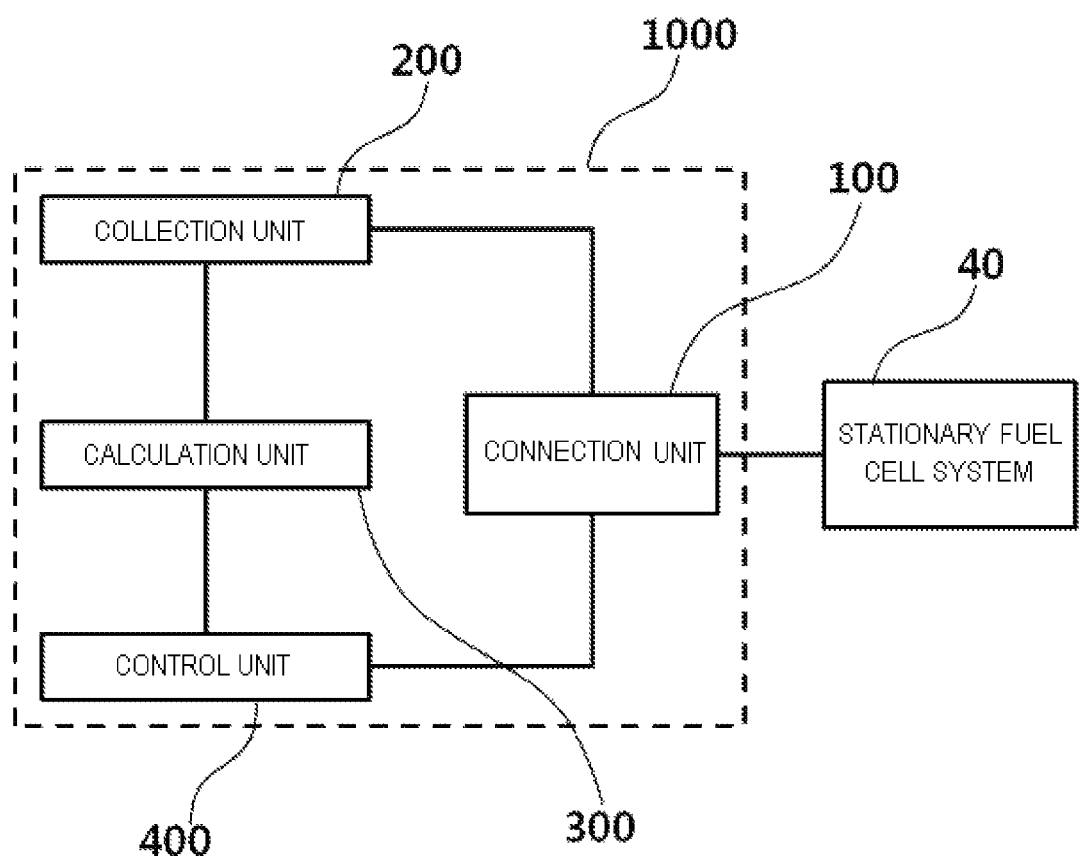
FIG. 2 is a conceptual diagram of an apparatus for managing a stationary fuel cell system according to an exemplary embodiment of the present invention.
Figure 3:
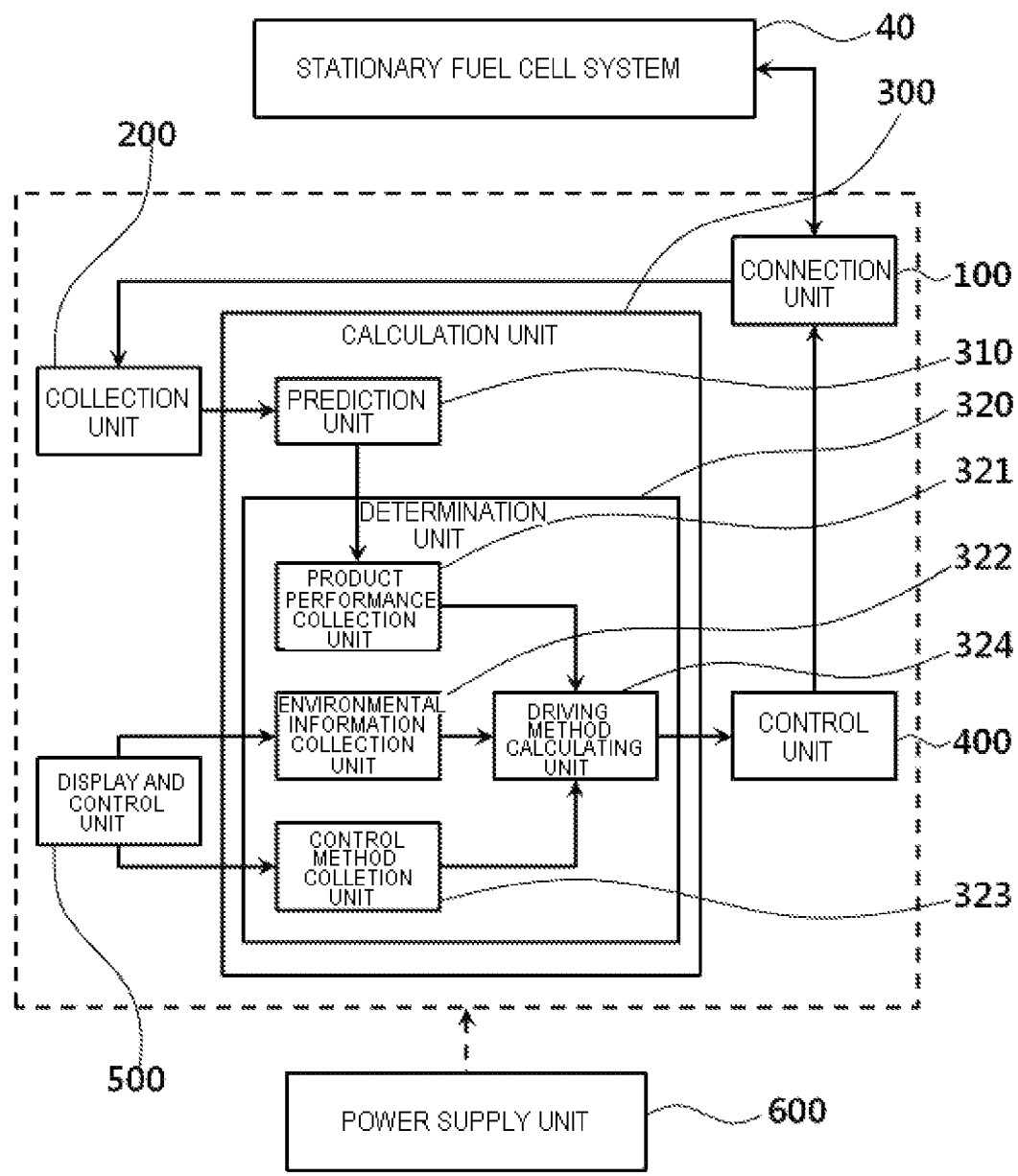
FIG. 3 is a detailed conceptual diagram of the apparatus for managing a stationary fuel cell system according to the exemplary embodiment of the present invention.
Figure 4:
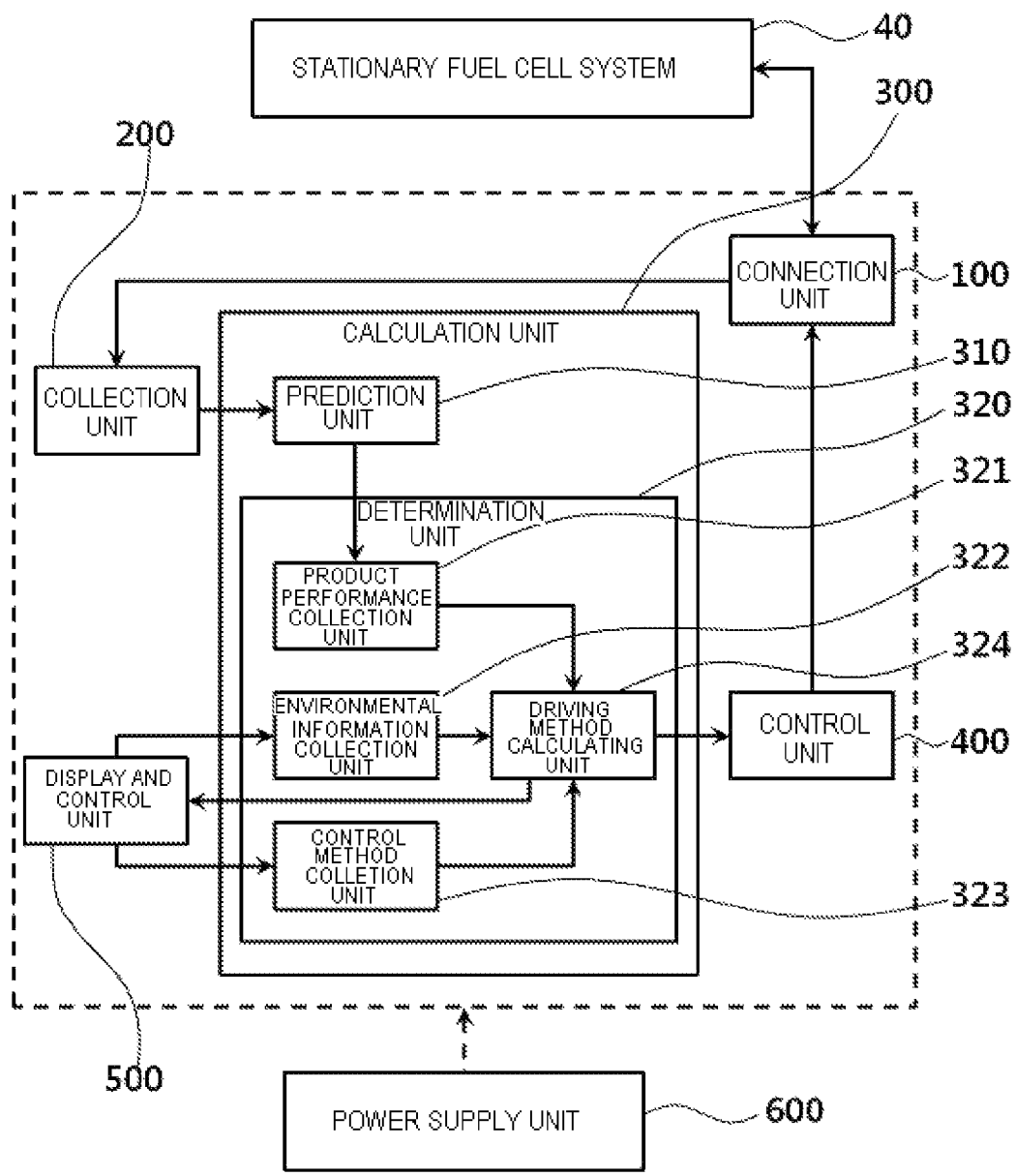
FIG. 4 is a detailed conceptual diagram of the apparatus for managing a stationary fuel cell system according to the exemplary embodiment of the present invention.
Figure 5:
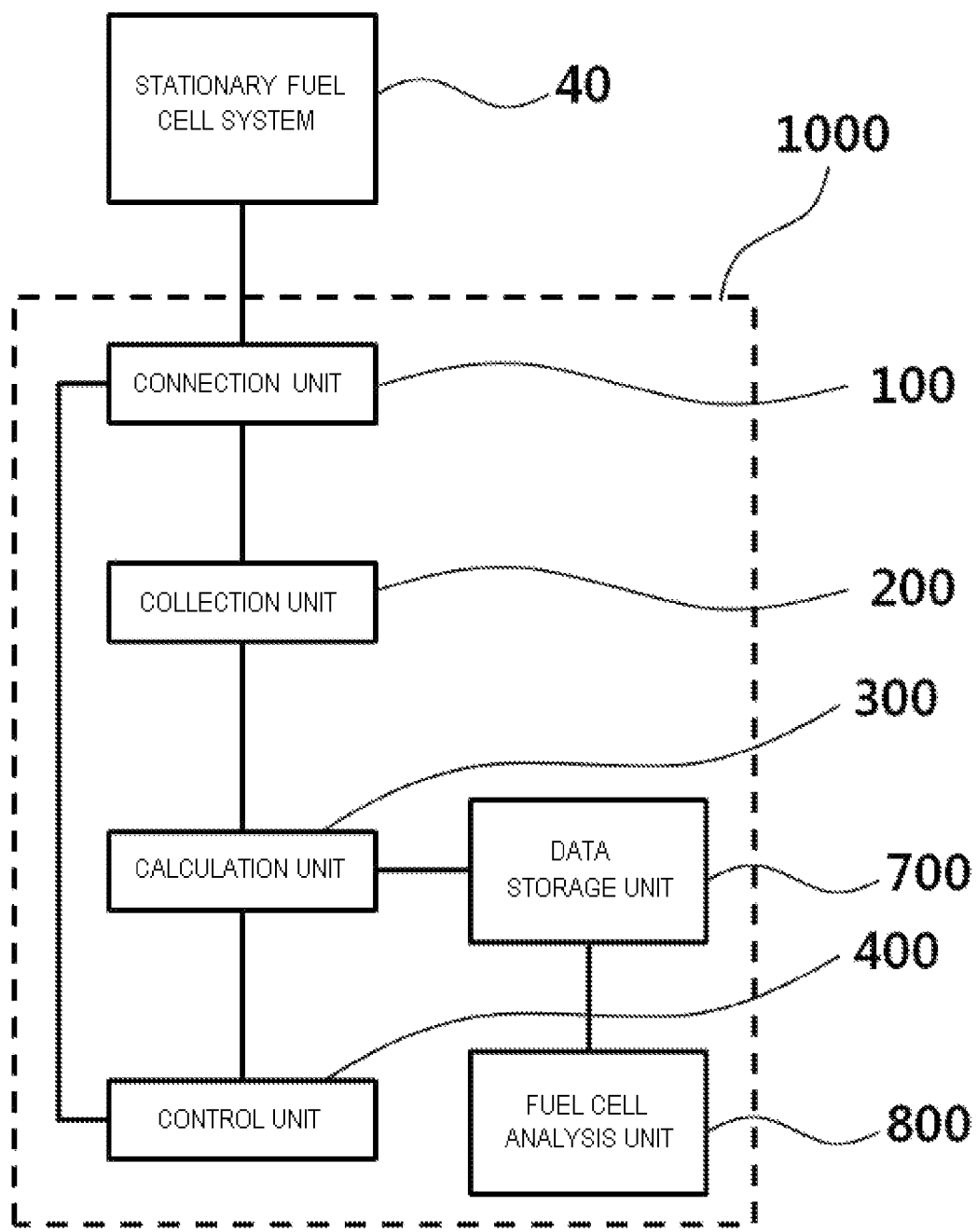
FIG. 5 is an exemplified diagram of the apparatus for managing a stationary fuel cell system according to the exemplary embodiment of the present invention.
Figure 6:
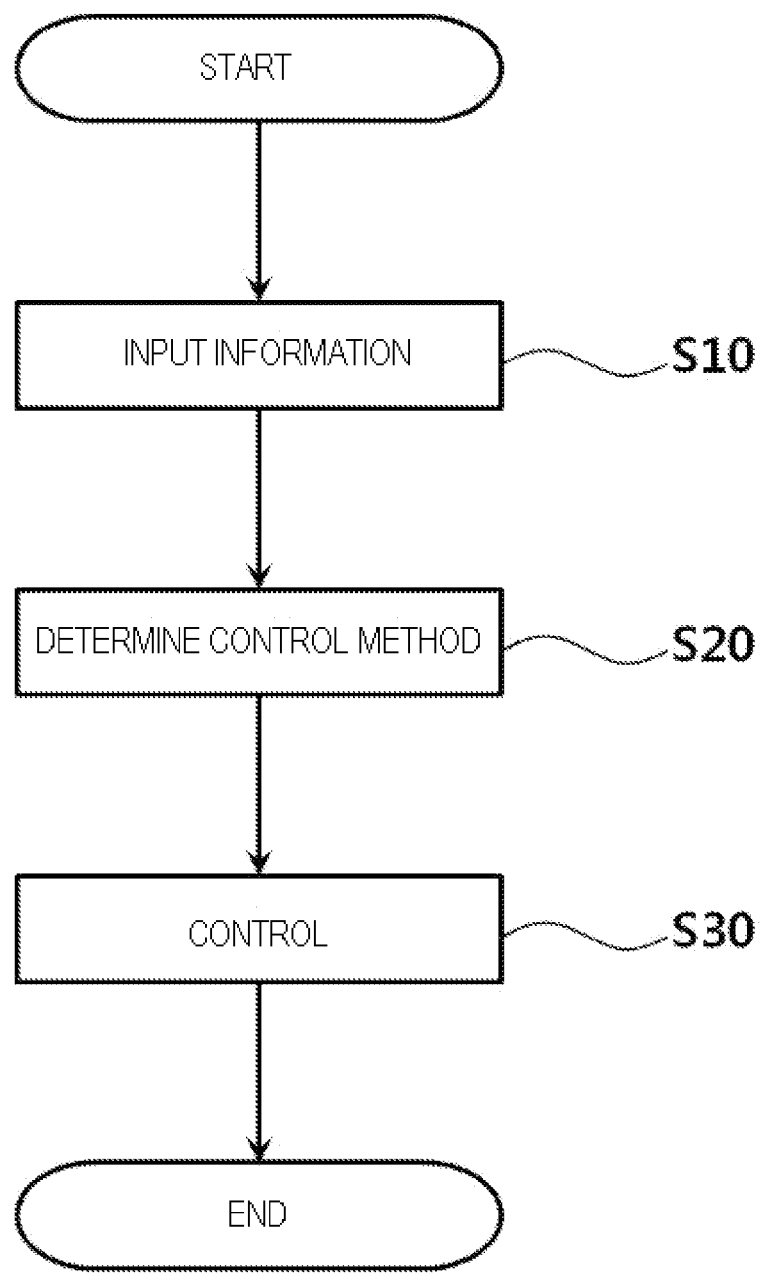
FIG. 6 is a flow chart of a method for managing a stationary fuel cell system according to an exemplary embodiment of the present invention.
Figure 7:
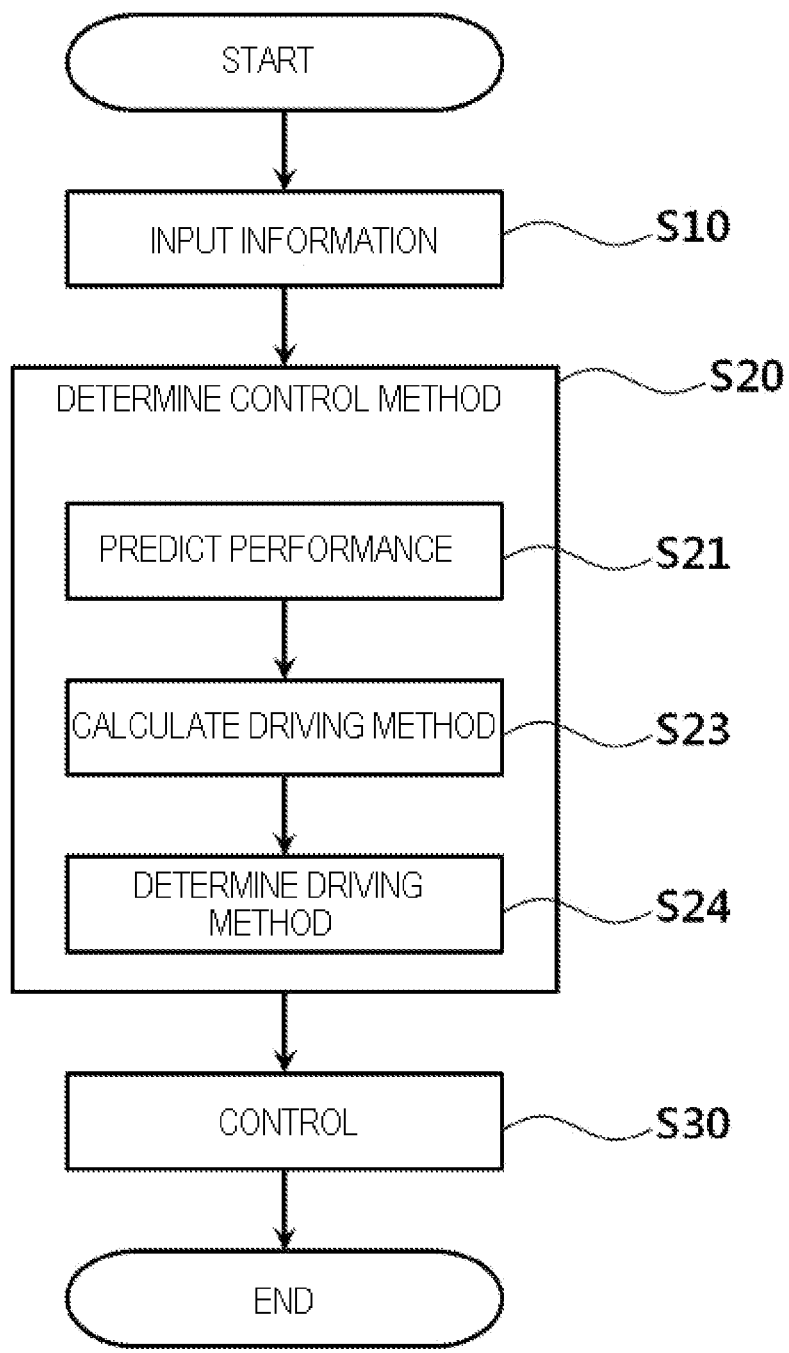
FIG. 7 is a flow chart of a method for managing a stationary fuel cell system according to a first exemplary embodiment of the present invention.
Figure 8:
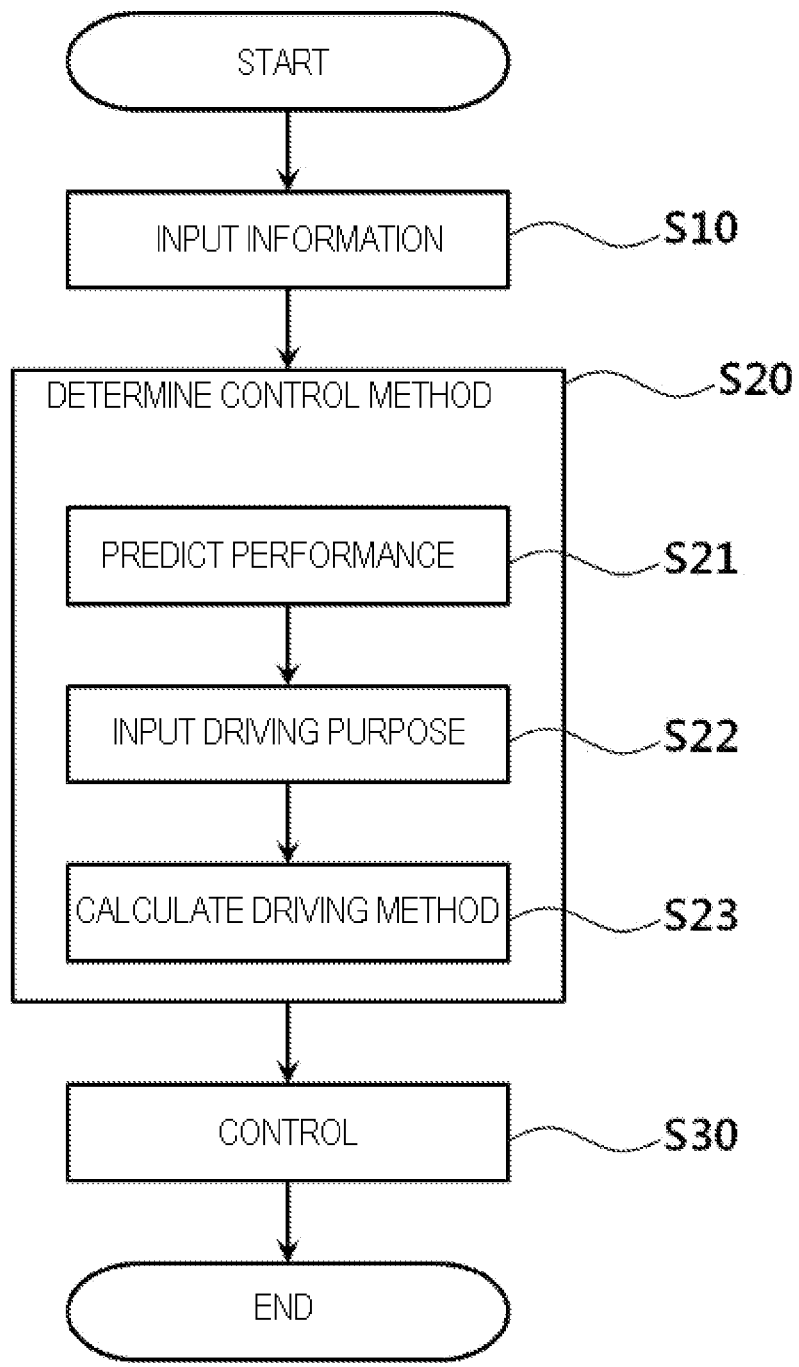
FIG. 8 is a flow chart of a method for managing a stationary fuel cell system according to a second exemplary embodiment of the present invention.

FIG. 1 is a conceptual diagram of a fuel cell system used by reforming fuel according to the related art, FIG. 2 is a conceptual diagram of an apparatus for managing a stationary fuel cell system according to an exemplary embodiment of the present invention, FIG. 3 is a detailed conceptual diagram of the apparatus for managing a stationary fuel cell system according to the exemplary embodiment of the present invention, FIG. 4 is a detailed conceptual diagram of the apparatus for managing a stationary fuel cell system according to the exemplary embodiment of the present invention, FIG. 5 is an exemplified diagram of the apparatus for managing a stationary fuel cell system according to the exemplary embodiment of the present invention, FIG. 6 is a flow chart of a method for managing a stationary fuel cell system according to an exemplary embodiment of the present invention, FIG. 7 is a flow chart of a method for managing a stationary fuel cell system according to a first exemplary embodiment of the present invention, and FIG. 8 is a flow chart of a method for managing a stationary fuel cell system according to a second exemplary embodiment of the present invention.

The apparatus for managing a stationary fuel cell system according to the exemplary embodiment of the present invention relates to an apparatus controlling the stationary fuel cell system by estimating performance of the stationary fuel cell system by receiving data of the stationary fuel cell system and calculating an efficient driving method according to environmental information and a driving purpose.

A general stationary fuel cell system is used by reforming fuel. In this case, as the available fuels, fossil fuel, biomass (methane ($CH_4$), and the like), water, and the like may be used. Herein, the fossil fuel means liquefied natural gas (LNG), natural gas (NG), liquefied petroleum gas (LPG), naphtha, coal gas, methanol, and the like.

As illustrated in FIG. 1, a stationary fuel cell system 70 used by reforming fuel may be configured to include a stationary fuel cell module 50 and a fuel conversion system 60. The stationary fuel cell module 50 may be configured to include a stationary fuel cell stack 51, a DC/DC converter, a DC/AC converter, and a balance of plant (BOP) 54. In this configuration, the balance of plant (BOP) 54 may be a stack air blower, a stack cooling water pump, a stack humidifier, a reformer fuel blower, a reformer air blower, a reformer burner fuel blower, a reformer air blower, a reformer water pump, a heat exchanger, a radiator, a cooling fan, a control device, various valves, a sensor, and the like. In this configuration, the balance of plant (BOP) may be configured to include a stack air blower (not illustrated) and a humidifier (not illustrated). Further, the fuel conversion system 60 may be configured to include a reformer 61 and a burner 62.

Since among various fuel cells, a phosphoric acid fuel cell (PAFC) which is very excellent in technical completeness, a solid polymer fuel cell (PEFC) which is rapidly developing to be able to be used in a car and a home, and the like use hydrogen as fuel, a need exists for a reformer which reforms hydrocarbon such as methanol, into hydrogen. The development of a reforming system is one of the important technology development problems in the fuel cell. The fuel conversion (reforming) system for a fuel cell includes three processes, that is, desulfurization, steam reforming, and CO shift.

Describing briefly an operating principle of the stationary fuel cell system used by reforming fuel, the burner 62 is supplied with fuel and air and delivers heat generated by igniting the fuel to a reformer. The reformer 61 is supplied with fuel and air to reform the fuel by using the delivered from the burner 62 and delivers the reformed hydrogen fuel to the stationary fuel cell stack 51 of the stationary fuel cell module 50. The stationary fuel cell stack 51 receives the hydrogen fuel converted by the fuel conversion system 60 and receives a compressed oxidizing agent (air, and the like) which is humidified by the stack air blower and the humidifier to generate electricity and heat. The electric energy generated from the stationary fuel cell stack 51 supplies required electricity to the balance of plant (BOP) 54, and converts the electricity into power, which may be used in loads, by using a DC/DC converter 52 and DC/AC inverter 53 and then supplies the electricity to the loads. Further, heat energy generated from the reformer 61, the burner 62, and the stationary fuel cell stack 51 may be used for hot water, heating, and the like.

As illustrated in FIG. 2, the apparatus for managing a stationary fuel cell system may be configured to include a connection unit 100, a collection unit 200, a calculation unit 300, and a control unit 400.

A general stationary fuel cell system 70 is configured to include the fuel conversion system 60 and control unit (not, illustrated) which receives information of the fuel conversion system 60 and the stationary fuel cell module 50 to control the stationary fuel cell system 70 and may be connected to the outside. The control unit (not illustrated) for external connection may also be configured to be included in the stationary fuel cell module 50 and the fuel conversion system 60 and may also be configured in the stationary fuel cell system 70 which is configured to include the stationary fuel cell module 50 and the fuel conversion system 60.

The connection unit 100 is detachably connected to the control unit of the stationary fuel cell system 70 which includes a household fuel cell, a building fuel cell, and a commercial fuel cell and is connected to the stationary fuel cell system 70. In this configuration, the connection unit 100 may be connected to the control unit which may provide information required in the collection unit 200.

In this configuration, the connection unit 100 may be directly connected to the control unit of the stationary fuel cell system 70, and the collection unit 200 and the control unit may be connected to each other by a cable.

The collection unit 200 is connected to the connection unit 100 to receive the data of the stationary fuel cell system 70. The data input from the stationary fuel cell system 70 may be directly measured data, data received from the outside, and data calculated by using the directly measured data and the data received from the outside. The collection unit 200 may collect at least one information selected from a flow rate of fuel supplied to a reformer, a flow rate of fuel supplied to a burner for the reformer, a voltage of the stationary fuel cell, a current for a stationary fuel cell, a flow rate of fuel supplied to a fuel conversion system, power of the stationary fuel cell, temperature of the stationary fuel cell, pressure of the stationary fuel cell, a fuel and oxidizing agent use rate of the stationary fuel cell, humidity of the stationary fuel cell, a total power consumption of a balance of plant (BOP) of the stationary fuel cell, efficiency of DC/DC converter, efficiency of a DC/AC inverter device, a flow rate of a heat recovery fluid, water enthalpy temperature of a hot water inlet, water enthalpy of temperature of a hot water outlet, an NG flow rate used in a home or a building as a usage other than the fuel cell, and an electric load quantity required in a home or a building.

The calculation unit 300 is connected to the collection unit 200 to determine a control method of the stationary fuel cell system 70 based on the received data.

Describing in more detail the calculation unit 300, as illustrated in FIGS. 3 to 5, the calculation, unit 300 may be configured to include a prediction unit 310 and a determination unit 320.

The prediction unit 310 is connected to the collection unit 200 to determine the performance of the stationary fuel cell system 70 based on the received data. In this case, the predictable performance of the stationary fuel cell system 70 may be performance, efficiency, lifespan, and the like, of components of the stationary fuel cell system 70.

The determination unit 320 is connected to the prediction unit 310 to determine the driving method of the stationary fuel cell system 70 based on the performance, the predetermined environmental information, and the predetermined driving purpose of the stationary fuel cell system 70.

Describing in more detail the determination unit 320, the determination unit 320 may be configured to include a product performance collection unit 321, an environmental information collection unit 322, a control method collection unit 323, and a driving method calculation unit 324.

The product performance collection unit 321 is connected to the prediction unit 310 to receive the performance information of the stationary fuel cell system 70.

The environmental information collection unit 322 is connected to the external input device to receive environmental information of at least any one selected from fuel cost, a fuel heating value, fuel composition information, electric cost, a discount rate of a fuel cost, a support fund for the fuel cost, and a fuel fare system.

The control method collection unit 323 is connected to the external input device to receive the driving purpose.

The driving method calculation unit 324 is connected to the product performance collection unit 321, the environmental information collection unit 322, and the control method collection unit 323 to calculate the driving method of the stationary fuel cell system 70 based on the performance, the environmental information, and the driving purpose of the stationary fuel cell system 70. In this case, various driving methods of the stationary fuel cell system 70 may be calculated based on several driving purposes by using the performance and the environmental information of the stationary fuel cell system 70. Describing by way of example, in calculating the driving method based on the performance and the environmental information of the stationary fuel cell system 70 which may be acquired in real time, various kinds of driving conditions may be generated depending on various directions. If it is assumed that the driving purpose is four conditions, four driving methods are calculated by calculating the driving method based on the four driving purposes using the performance and the environmental information of the stationary fuel cell system 70. However, when the driving method is calculated by determining and using the performance, the environmental information, and the one driving purpose of the stationary fuel cell system 70, only the one driving method may be calculated. Herein, if it is assumed that the four driving methods are calculated, one of them is determined and the control method of the stationary fuel cell system 70 is determined based on the determined driving method to be able to control the stationary fuel cell system 70. Further, if it is assumed that the one driving method is calculated, the driving method is determined by one of them and the control method of the stationary fuel cell system 70 is determined based on the determined driving method to be able to control the stationary fuel cell system 70. Various efficiencies depending on the driving purpose are presented in various aspects as described above and thus the efficiency of the stationary fuel cell system 70 may be increased.

The control unit 400 is connected to the calculation unit 300 and the connection unit 100 to control the stationary fuel cell system 70 on the basis of the control method determined by the calculation unit 300. Herein, the flow rate of the heat recovery fluid and the setting temperature of the outlet of the stationary fuel cell stack may be controlled by the method for controlling the temperature of the stationary fuel cell stack. Further, the back pressure of the stationary fuel cell stack may be controlled by the method for controlling the pressure of the stationary fuel cell stack. Further, a supply quantity of the oxidizing agent (air, and the like) and fuel supply apparatus such as a stationary fuel cell stack air blower, a reformer fuel and air blower, and a reformer burner fuel and air blower may be controlled by the method for controlling the fuel and oxidizing agent use rate of the stationary fuel cell stack. Further, the humidification quantity of the outlet gas of the humidifier attached to the fuel and oxidizing agent (air, and the like) of the stationary fuel cell stack and may be controlled by the method for controlling the humidity of the stationary fuel cell stack.

The apparatus 1000 for managing a stationary fuel cell system according to the exemplary embodiment of the present invention further includes: a display and control unit 500 which is connected to the calculation unit 300, inputs the environmental information and the driving purpose to the calculation unit 300, and outputs the input environmental information and driving purpose. In this case, the display and control unit 500 may be operated by being included in a managing unit which manages the stationary fuel cell system 70. Herein, the driving purpose of the display and control unit 500 may be at least any one selected from electrical efficiency, heat efficiency, summing efficiency of electricity and heat, LNG operating cost efficiency, power operating cost efficiency, and summing efficiency of LNG operating cost and power operating cost.

Describing in more detail the display and control unit 500, as illustrated in FIG. 3, the display and control unit 500 is connected to the environmental information collection unit 322 and the control method collection unit 323, respectively, to input the environmental information input through the display and control unit 500 to the environmental information collection unit 322 and input the driving method input through the display and control unit 500 to the control method collection unit 323. In this case, only one driving method may be calculated by inputting the environmental information and the driving method. Further, as illustrated in FIG. 4, the display and control unit 500 is connected to the environmental information collection unit 322, the control method collection unit 323, and the driving method calculation unit 324, respectively, to be able to output each of the driving methods through the display and control unit 500 and determine one driving method selected by the display and control unit 500 as the control method, depending on each of the driving purposes which may be selected based on the performance of the stationary fuel cell system 70 input to the product performance collection unit 321 and the environmental information input to the environmental information collection unit 322. Further, the display and control unit 500 may output information for helping the selection of a driver.

As illustrated in FIGS. 3 and 4, the apparatus 1000 for managing a stationary fuel cell system according to the exemplary embodiment of the present invention further includes a power supply unit 600. In this configuration, the power supply unit 600 includes a battery for supplying power and supplies power to the apparatus 1000 for managing a stationary fuel cell system.

As illustrated in FIG. 5, the apparatus 1000 for managing a stationary fuel cell system according to the exemplary embodiment of the present invention further includes a data storage unit 700 and a fuel cell analysis unit 800.

The data storage unit 700 is connected to the calculation unit 300 to store and manage all the data.

The fuel cell analysis unit 800 is connected to the data storage unit 700 to analyze the stationary fuel cell system 70, thereby estimating the characteristics of the stationary fuel cell system 70. In this case, the characteristics of the stationary fuel cell system 70 which are figured out by using all the stored information may provide information suitable for improvement of a product.

The method for managing a stationary fuel cell system according to the exemplary embodiment of the present invention relates to an apparatus controlling the stationary fuel cell system by estimating performance of the stationary fuel cell system by receiving product information of the stationary fuel cell system and calculating an efficient driving method according to environmental information and a driving purpose.

A general stationary fuel cell system is used by reforming fuel. In this case, as the available fuels, fossil fuel, biomass (methane ($CH_4$), and the like), water, and the like may be used. Herein, the fossil fuel means liquefied natural gas (LNG), natural gas (NG), liquefied petroleum gas (LPG), naphtha, coal gas, methanol, and the like.

As illustrated in FIG. 1, a stationary fuel cell system 70 used by reforming fuel may be configured to include a stationary fuel cell module 50 and a fuel conversion system 60. The stationary fuel cell module 50 may be configured to include a stationary fuel cell stack 51, the DC/DC converter, the DC/AC converter, and the balance of plant (BOP) 54. In this configuration, the balance of plant (BOP) 54 may be a stack air blower, a stack cooling water pump, a stack humidifier, a reformer fuel blower, a reformer air blower, a reformer burner fuel blower, a reformer air blower, a reformer water pump, a heat exchanger, a radiator, a cooling fan, a control device, various valves, a sensor, and the like. In this configuration, the balance of plant (BOP) may be configured to include a stack air blower (not illustrated) and a humidifier (not illustrated). Further, the fuel conversion system 60 may be configured to include a reformer 61 and a burner 62.

Since among various fuel cells, a phosphoric acid fuel cell (PAFC) which is very excellent in technical completeness, a solid polymer fuel cell (PEFC) which is rapidly developing to be able to be used in a car and a home, and the like use hydrogen as fuel, a need exists for a reformer which reforms hydrocarbon such as methanol, into hydrogen. The development of a reforming system is one of the important technology development problems in the fuel cell. The fuel conversion (reforming) system for a fuel cell includes three processes, that is, desulfurization, steam reforming, and CO shift.

Describing briefly an operating principle of the stationary fuel cell system used by reforming fuel, the burner 62 is supplied with fuel and air and delivers heat generated by igniting the fuel to a reformer. The reformer 61 is supplied with fuel and air to reform the fuel by using the delivered from the burner 62 and delivers the reformed hydrogen fuel to the stationary fuel cell stack 51 of the stationary fuel cell module 50. The stationary fuel cell stack 51 receives the hydrogen fuel converted by the fuel conversion system 60 and receives a compressed oxidizing agent (air, and the like) which is humidified by the stack air blower and the humidifier to generate electricity and heat. The electric energy generated from the stationary fuel cell stack 51 supplies required electricity to the balance of plant (BOP) 54, and converts the electricity into power, which may be used in loads, by using the DC/DC converter 52 and the DC/AC inverter 53 and then supplies the electricity to the loads. Further, heat energy generated from the reformer 61, the burner 62, and the stationary fuel cell stack 51 may be used for hot water, heating, and the like.

As illustrated in FIG. 2, the apparatus for managing a stationary fuel cell system may be configured to include a connection unit 100, a collection unit 200, a calculation unit 300, and a control unit 400.

A general stationary fuel cell system 70 is configured to include the fuel conversion system 60 and a control unit (not illustrated) which receives information of the fuel conversion system 60 and the stationary fuel cell module 50 to control the stationary fuel cell system 70 and may be connected to the outside. The control unit (not illustrated) for external connection may also be configured to be included in the stationary fuel cell module 50 and the fuel conversion system 60 and may also be configured in the stationary fuel cell system 70 which is configured to include the stationary fuel cell module 50 and the fuel conversion system 60.

The connection unit 100 is detachably connected to the control unit of the stationary fuel cell system 70 which includes a household fuel cell, a building fuel cell, and a commercial fuel cell and is connected to the stationary fuel cell system 70. In this configuration, the connection unit 100 may be connected to the control unit which may provide information required in the collection unit 200.

The collection unit 200 is connected to the connection unit 100 to receive the product information of the stationary fuel cell system 70. The product information may be directly measured data, data received from the outside, and data calculated by using the directly measured data and the data received from the outside.

The calculation unit 300 is connected to the collection unit 200 to determine a control method of the stationary fuel cell system 70 based on the received product information.

The control unit 400 is connected to the calculation unit 300 and the connection unit 100 to control the stationary fuel cell system 70 on the basis of the control method determined by the calculation unit 300.

As illustrated in FIG. 6, the method for managing a stationary fuel cell system according to the exemplary embodiment of the present invention of the apparatus 1000 for managing a stationary fuel cell system including the connection unit 100 which is detachably connected to the control unit of the stationary fuel cell system 70, the collection unit 200, the calculation unit 300, and the control unit 400 includes the inputting of the information (S10), the determining of the control method (S20), and the controlling (S30).

In the inputting of the information (S10), the collection unit 200 receives the product information through the connection unit and the calculation unit 300 is connected to the external input device to receive the environmental information. The product information of the inputting of the information (S10) is at least one selected from a flow rate of fuel supplied to a reformer, a flow rate of fuel supplied to a burner for the reformer, a voltage of the stationary fuel cell, a current for a stationary fuel cell, a flow rate of fuel supplied to a fuel conversion system, power of the stationary fuel cell, temperature of the stationary fuel cell, pressure of the stationary fuel cell, a fuel and oxidizing agent use rate of the stationary fuel cell, humidity of the stationary fuel cell, a total power consumption of a balance of plant (BOP) of the stationary fuel cell, efficiency of DC/DC converter, efficiency of a DC/AC inverter device, a flow rate of a heat recovery fluid, water enthalpy of temperature of a hot water inlet, water enthalpy of temperature of a hot water outlet, an NG flow rate used in a home or a building as a usage other than the fuel cell, and an electric load quantity required in a home or a building. Further, the environmental information of the inputting of the information (S10) may be at least any one selected from the fuel cost, the fuel heating value, the fuel composition information, the electric cost, the discount rate of the fuel cost, the support fund for the fuel cost, and the fuel fare system In this case, the environmental information is connected to the external input device so as to be input from the external input device.

The determining of the control method (S20) determines, by the calculation unit 300, a method for controlling the stationary fuel cell system 70 to increase driving efficiency or decrease driving cost by calculating a driving method depending on at least any one driving purpose selected from driving having electrical efficiency, driving having high heat efficiency, and driving having high overall efficiency which is a sum of the electrical efficiency and the heat efficiency or at least any one driving purpose selected from driving having low fuel used cost, driving having low electricity use cost, and driving having overall cost which is a sum of the fuel use cost and the electricity use cost, based on the product information and the environmental information input in the inputting of the information.

The driving having high electrical efficiency is driving having highest electrical efficiency based on the following Formula.

$$\eta_p = \frac{3600 \times \left(W_{stack} - \frac{W_{BOP}}{E_{cov}}\right) E_{inv}}{F_{NG-in} \times K}$$

($\eta_p$ represents the electrical efficiency, $W_{stack}$ represents electric output (voltage×current) generated from the stationary fuel cell stack, $W_{BOP}$ represents a sum of the electric output (voltage×current) consumed from the balance of plant (BOP), $E_{cov}$ represents the efficiency of the DC/DC converter, $E_{inv}$ represents the efficiency of the DC/AC inverter, $F_{NG-in}$ represents the flow rate of fuel supplied to the fuel conversion system, and K represents the fuel heating value).

In this case, the flow rate of the fuel supplied to the fuel conversion system may be obtained by summing the flow rate of fuel supplied to the reformer and the flow rate of fuel supplied to the burner for the reformer and the power generated from the stationary fuel cell stack may be obtained by multiplying the current of the stationary fuel cell by the voltage of the stationary fuel cell.

The driving having high heat efficiency is driving having highest heat efficiency based on the following Formula.

$$\eta_h = \frac{((i_2 - i_1)Q)}{F_{NG-in} \times K}$$

($\eta_h$ represents the heat efficiency, Q represents the flow rate of the heat recovery fluid, $i_1$ represents the water enthalpy of the temperature of the hot water inlet, $i_2$ represents the water enthalpy of the temperature of the hot water outlet, $F_{NG-in}$ represents the flow rate of the fuel supplied to the fuel conversion system, and K represents the fuel heating value).

The driving having overall efficiency is driving having highest overall efficiency based on the following Formula.

$$n_{sfc} = \frac{\left(3600 \times \left(W_{stack} - \frac{W_{BOP}}{E_{cov}}\right) E_{inv}\right) + ((i_2 - i_1)Q)}{F_{NG-in} \times K}$$

($\eta_{sfc}$ represents the overall efficiency, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{ir}$ represents the efficiency of the DC/AC inverter, Q represents the flow rate of the heat recovery fluid, $i_1$ represents the water enthalpy of the temperature of the hot water inlet, $i_2$ represents the water enthalpy of the temperature of the hot water outlet, $F_{NG-in}$ represents the flow rate of fuel supplied to the fuel conversion system, and K represents the fuel heating value).

Herein, when values for each variable in Formula which may represent the highest efficiency based on the driving purpose of at least any one selected from the driving having high electrical efficiency, the driving having high heat efficiency, and the driving having overall efficiency which is a sum of the electrical efficiency and the heat efficiency are determined, the corresponding device is controlled by values corresponding to the values for each variable. In this case, the Formula which may show the highest efficiency becomes the driving method and controlling the corresponding device by the values for each variable becomes the control method.

For example, in the case of the driving having electrical efficiency, the driving method having the highest electrical efficiency may be calculated based on the electric output $W_{stack}$ generated from the stationary fuel cell stack, the total power consumption $W_{BOP}$ of the balance of plant (BOP), the efficiency $E_{cov}$ of the DC/DC converter, the efficiency $E_{inv}$ of the DC/AC inverter, the flow rate $F_{NG-in}$ of the fuel supplied to the fuel conversion system, and the fuel heating value K.

Herein, the electric output $W_{stack}$ generated from the stationary fuel cell stack has variable values when electrical efficiency related control variables (the temperature of the fuel cell stack, the pressure of the fuel cell stack, the humidity of the fuel cell stack, the fuel and oxidizing agent use rate of the fuel cell stack, and the temperature of the reformer) are changed within a controllable range, in which the change in the values may be predicted based on a previously constructed model, the total power consumption $W_{BOP}$ of the balance of plant (BOP), the efficiency $E_{cov}$ of the DC/DC converter, the efficiency $E_{inv}$ of the DC/AC inverter have gradually deteriorated values as a driving period is increased, in which the change in the values is measured in real time, the flow rate $F_{NG-in}$ of the fuel supplied to the fuel conversion system is measured in real time, and the fuel heating value K is received in real time to calculate the driving method (the values for the electric efficiency related control variables at which the electric output $W_{stack}$ generated from the stationary fuel cell stack is highest) having the highest electrical efficiency $\eta_p$ based on the Formula $$\eta_p = \frac{3600 \times \left(W_{stack} - \frac{W_{BOP}}{E_{cov}}\right) E_{inv}}{F_{NG-in} \times K}.$$

Here, since it takes much time to measure the electric output $W_{stack}$ by the experiment, a model (Formula) for the electric output $W_{stack}$ may be constructed by numerous combinations of the driving variables based on a theoretical formula and an empirical formula which represent a correlation between already known various driving variables (the temperature of the fuel cell stack, the pressure of the fuel cell stack, the humidity of the fuel cell stack, the fuel and oxidizing agent use rate of the fuel cell stack, and the temperature of the reformer) and the electric output and the electric output may be predicted in real time based on the previously constructed model (Formula). In other words, by predicting the electric output $W_{stack}$ generated from the stationary fuel cell stack by constructing the model, the real-time response may be performed without actually measuring the efficiency.

Further, the variables (the electric load $W_1$, the total power consumption $W_{BOP}$ of the balance of plant (BOP), the efficiency $E_{cov}$ of the DC/DC converter, and the efficiency $E_{inv}$ of the DC/AC inverter) which are frequently changed with the passage of time use values which are measured in real time.

The control method according to the driving method calculated as described above may control the flow rate of the heat recovery fluid and a setting temperature of an outlet of the stationary fuel cell stack to control the fuel cell stack temperature, control a back pressure of the stationary fuel cell stack to control the pressure of the fuel cell stack, control a humidification quantity of outlet gas of the humidifier attached to the fuel and oxidizing agent (air, and the like) supply unit of the stationary fuel cell stack to control the humidity of the fuel cell stack, control a supply quantity of the stationary fuel cell stack air blower, the reformer fuel and air blower, the reformer burner fuel and air blower, and the like to control the fuel and oxidizing use rate of the fuel cell stack, and control a reformer burner supply fuel flow rate (or corresponding blower rpm) and a supply flow rate (or corresponding blower rpm) of a reformer burner supply oxidizing agent (air, and the like) to control the temperature of the reformer.

In the case of the driving having the high heat efficiency, the driving method having highest heat efficiency may be calculated based on the flow rate Q of the heat recovery fluid, the water enthalpy $i_1$ of the temperature of the hot water inlet, the water enthalpy $i_2$ of the temperature of the hot water outlet, the flow rate $F_{NG-in}$ of the fuel supplied to the fuel conversion system, and the fuel heating value K.

Herein, when the flow rate Q of the heat recovery fluid, the water enthalpy $i_1$ of the temperature of the hot water inlet, and the water enthalpy $i_2$ of the temperature of the hot water outlet have the variable values when the heat efficiency related control variables (temperature of a cooling water inlet and temperature of a cooling water outlet) are changed within the controllable range, in which the change in the values may be predicted based on the previously constructed model, and the flow rate $F_{NG-in}$ of the fuel supplied to the fuel conversion system is measured in real time and the fuel heating value K is received in real time to calculate the driving method (the value for the heat efficiency related control variables at which $(i_2-i_1) Q$ is highest) based on the Formula $$\eta_h = \frac{((i_2 - i_1)Q)}{F_{NG-in} \times K}.$$

Even in this case, by predicting the water enthalpy $i_1$ of the temperature of the hot water inlet, the water enthalpy $i_2$ of the temperature of the hot water outlet, and the flow rate Q of the heat recovery fluid based on constructing the model, the real-time response may be performed without actually measuring the efficiency.

The control method according to the driving method calculated as described above may control the temperature of the cooling water inlet by controlling a wind speed of a fan which controls a cooling degree of the radiator through which the cooling water of the stack outlet passes and control the change in the required flow rate of the cooling water by controlling the supply flow rate (or corresponding pump rpm, and the like) of the water pump so as to control the temperature of the cooling water outlet to the desired value.

Therefore, each variable described in the driving having high electrical efficiency may be controlled, the temperature of the cooling water inlet may be controlled by controlling the wind speed of the fan controlling the cooling degree of the radiator through which the cooling water of the stack outlet passes, and the temperature of the cooling water outlet may be controlled by controlling the supply flow rate (or corresponding pump rpm) of the water pump.

In the case of the driving having high overall efficiency, the control method is determined by calculating the driving method making summing efficiency of the driving having high heat efficiency and the driving having high electrical efficiency highest.

Further, the driving having low fuel use cost may be driving having lowest fuel use cost based on the following Formula.

$$C_{NG-in} = UC_{NG}(F_{NG-1} + F_{NG-in})$$

($C_{NG-in}$ represents the fuel use cost, $UC_{NG}$ represents the fuel cost, $F_{NG-1}$ represents the fuel flow rate used as a usage other than the stationary fuel cell, and $F_{NG-in}$ represents the flow rate of the fuel supplied to the fuel conversion system).

The driving having low electricity use cost may be driving having lowest electricity use cost based on the following Formula.

$$C_p = \left(UC_p \times \left(W_1 - \left(W_{stack} - \frac{W_{BOP}}{E_{cov}}\right)E_{inv}\right)\right)$$

($C_p$ represents the electricity use cost, $UC_p$ represents the electric cost, $W_1$ represents the electric load used as a usage other than the stationary fuel cell, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, and $E_{inv}$ represents the efficiency of the DC/AC inverter).

The driving having low total cost may be driving having lowest total cost based on the following Formula.

$$C_{sfc} = \left(UC_p \times \left(W_1 - \left(W_{stack} - \frac{W_{BOP}}{E_{cov}}\right)E_{inv}\right)\right) + (UC_{NG}(F_{NG-1} + F_{NG-in}))$$

($C_{sfc}$ represents the total cost, $UC_p$ represents the electric cost, $W_1$ represents the electric load used as a usage other than the stationary fuel cell, $W_{stack}$ represents the electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{inv}$ represents the efficiency of the DC/AC inverter, $UC_{NG}$ represents the fuel cost, $F_{NG-1}$ represents the flow rate of fuel used as the usage other than the stationary fuel cell, and $F_{NG-in}$ represents the flow rate of the fuel supplied to the fuel conversion system).

Herein, when the values for each variable in Formula which may represent the lowest cost depending on at least one driving purpose selected from the driving having low fuel use cost, the driving having low electricity use cost, and the driving having low total cost which is a sum of the fuel use cost and the electricity use cost are determined based on the measured information, the corresponding device is controlled by the values corresponding to the values of each variable. In this case, the Formula which may represent the lowest cost becomes the driving method and controlling the corresponding device by the values for each variable becomes the control method.

For example, in the case of the driving having low electricity use cost, the driving method having lowest electricity use cost may be calculated based on the electric load $W_1$ used as a usage other than the stationary fuel cell, the electric output $W_{stack}$ generated from the stationary fuel cell stack, the total power consumption of the balance of plant (BOP), the efficiency $E_{cov}$ of the DC/DC converter, and the efficiency $E_{inv}$ of the DC/AC inverter.

Herein, the electric output $W_{stack}$ generated from the stationary fuel cell stack has the variable values when the electricity use cost related control variables (the temperature of the fuel cell stack, the pressure of the fuel cell stack, the humidity of the fuel cell stack, the fuel and oxidizing agent use rate of the fuel cell stack, and the temperature of the reformer) are changed within a controllable range, in which the change in the values may be predicted based on the constructed model, the electric load $W_1$ used as a usage other than the stationary fuel cell, the total power consumption $W_{BOP}$ of the balance of plant (BOP), the efficiency $E_{cov}$ of the DC/DC converter, and the efficiency $E_{inv}$ of the DC/AC inverter have gradually changed values as the driving period is increased, in which the change in the values is measured in real time, and the electric cost $UC_p$ is received in real time to calculate the driving method (the values for the electricity use cost related control variables at which the electric output $W_{stack}$ generated from the stationary fuel cell stack is highest) having the smallest electricity use cost $C_p$ and the efficiency $E_{inv}$ of the DC/AC inverter based on the Formula $$C_p = \left(UC_p \times \left(W_1 - \left(W_{stack} - \frac{W_{BOP}}{E_{cov}}\right)E_{inv}\right)\right).$$

Here, since it takes much time to measure the electric output $W_{stack}$ by the experiment, a model (Formula) for the electric output $W_{stack}$ stack may be constructed by numerous combinations of the driving variables based on a theoretical formula and an empirical formula which represent a correlation between already known various driving variables (the temperature of the fuel cell stack, the pressure of the fuel cell stack, the humidity of the fuel cell stack, the fuel and oxidizing agent use rate of the fuel cell stack, and the temperature of the reformer) and the electric output and the electric output may be predicted in real time based on the previously constructed model (Formula). In other words, by predicting the electric output $W_{stack}$ generated from the stationary fuel cell stack by constructing the model, the real-time response may be performed without actually measuring the electricity use cost.

Further, the variables (the electric load $W_1$, the total power consumption $W_{BOP}$ of the balance of plant (BOP), the efficiency $E_{cov}$ of the DC/DC converter, and the efficiency $E_{inv}$ of the DC/AC inverter) which are frequently changed with the passage of time use values which are measured in real time.

The control method according to the driving method calculated as described above may control the flow rate of the heat recovery fluid and a setting temperature of an outlet of the stationary fuel cell stack to control the fuel cell stack temperature, control a back pressure of the stationary fuel cell stack to control the pressure of the fuel cell stack, control a humidification quantity of outlet gas of the humidifier attached to the fuel and oxidizing agent (air, and the like) supply unit of the stationary fuel cell stack to control the humidity of the fuel cell stack, control a supply quantity of the stationary fuel cell stack air blower, the reformer fuel and air blower, the reformer burner fuel and air blower, and the like to control the fuel and oxidizing use rate of the fuel cell stack, and control a reformer burner supply fuel flow rate (or corresponding blower rpm) and a supply flow rate (or corresponding blower rpm) of a reformer burner supply oxidizing agent (air, and the like) to control the temperature of the reformer.

In the case of the driving having low fuel use cost, the driving method having lowest fuel use cost may be calculated based on a fuel flow rate $F_{NG-1}$ used as a usage other than the stationary fuel cell and the flow rate $F_{NG-in}$ an the fuel cost $UC_{NG}$ of the fuel supplied to the fuel conversion system. Herein, the flow rate $F_{NG-in}$ of the fuel supplied to the fuel conversion system has the variable values when the fuel use cost related control variables (the temperature of the cooling water inlet and the temperature of the cooling water outlet) are changed within a controllable range, in which the change in the values may be predicted based on the previously constructed model, the fuel flow rate $F_{NG-1}$ used as usages other than the stationary fuel cell is measured in real time and the fuel cost $UC_{NG}$ is received in real time to calculate the driving method of the fuel cell (the values for the fuel use cost related control variables at which the flow rate $F_{NG-in}$ of the fuel supplied to the fuel conversion system is smallest) having the smallest fuel use cost $C_{NG-in}$ and the efficiency $E_{inv}$ of the DC/AC inverter based on the Formula $C_{NG-in}=UC_{NG}(F_{NG-1}+F_{NG-in})$.

Even in this case, by predicting the flow rate $F_{NG-in}$ of the fuel supplied to the fuel conversion system by constructing the model, the real-time response may be performed without actually measuring the fuel use cost.

The control method according to the driving method calculated as described above may control the temperature of the cooling water inlet by controlling a wind speed of a fan which controls a cooling degree of the radiator through which the cooling water of the stack outlet passes and control the change in the required flow rate of the cooling water by controlling the supply flow rate (or corresponding pump rpm, and the like) of the water pump so as to control the temperature of the cooling water outlet to the desired value.

Therefore, each variable described in the driving having the low electricity use cost may be controlled, the temperature of the cooling water inlet may be controlled by controlling the wind speed of the fan controlling the cooling degree of the radiator through which the cooling water of the stack outlet passes, and the temperature of the cooling water outlet may be controlled by controlling the supply flow rate (or corresponding pump rpm) of the water pump.

In the case of the driving having low total cost, the control method is determined by calculating the driving method making the summed cost of the driving having fuel use cost and the driving having low electricity use cost highest.

As illustrated in FIG. 7, the determining of the control method (S20) of the method for managing a stationary fuel cell system according to a first exemplary embodiment of the present invention includes predicting the performance (S21), calculating the driving method (S23), and determining the driving method (S24).

In the predicting of the performance (S21), the performance of the stationary fuel cell system 70 is predicted based on the product information input in the inputting of the information. In this case, the predictable performance of the stationary fuel cell system 70 may be performance, efficiency, lifespan, and the like, of components of the stationary fuel cell system 70.

In the calculating of the driving method (S23), the driving method depending on at least one driving condition is calculated based on the performance of the stationary fuel cell system 70 predicted in the predicting of the performance (S21) and the environmental information input in the inputting of the information. In this case, various driving methods of the stationary fuel cell system 70 may be calculated based on several driving purposes by using the performance and the environmental information of the stationary fuel cell system 70. Describing by way of example, in calculating the driving method based on the performance and the environmental information of the stationary fuel cell system 70 which may be acquired in real time, various kinds of driving conditions may be generated depending on various directions. If it is assumed that the driving purpose is four conditions, four driving methods are calculated by calculating the driving method based on the four driving purposes using the performance and the environmental information of the stationary fuel cell system 70. Various efficiencies depending on the driving purpose are presented in various aspects as described above and thus the efficiency of the stationary fuel cell system 70 may be increased.

In the determining of the driving method (S24), one of the at least one driving method calculated in the calculating of the driving method (S23) is selected. As described in the above example, if it is assumed that the four driving methods are calculated, one of them is determined and the control method of the stationary fuel cell system 70 is determined based on the determined driving method to be able to control the stationary fuel cell system 70.

As illustrated in FIG. 8, the determining of the control method (S20) of the method for managing a stationary fuel cell system according to a second exemplary embodiment of the present invention includes the predicting of the performance (S21), the inputting of the driving purpose (S22), and the calculating of the driving method (S23).

In the predicting of the performance (S21), the performance of the stationary fuel cell system 70 is predicted based on the product information input in the inputting of the information. In this case, the predictable performance of the stationary fuel cell system 70 may be performance, efficiency, lifespan, and the like, of components of the stationary fuel cell system 70.

In the inputting of the driving purpose (S22), the driving purpose is selected and input by using the external input device.

In the calculating of the driving method (S23), the driving method is calculated based on the performance of the stationary fuel cell system 70 predicted in the predicting of the performance (S21), the environmental information input in the inputting of the information (S10), and the driving purpose input in the inputting of the driving purpose (S22). When the driving method is calculated based on the performance of the stationary fuel cell system 70, the environmental information, and the driving purpose input in the inputting of the driving purpose (S22), only the one driving method may be calculated. If it is assumed that only the one driving method is calculated, the control method of the stationary fuel cell system 70 is determined based on the one driving method to be able to control the stationary fuel cell system 70.

In the controlling (S30), the control unit 400 controls the stationary fuel cell system 70 based on the control method determined in the determining of the control method. Herein, power of an outlet of a system interconnection inverter for the stationary fuel cell stack may be controlled by the method for controlling the load of the stationary fuel cell stack. Further, the flow rate of the heat recovery fluid and the setting temperature of the outlet of the stationary fuel cell stack may be controlled by the method for controlling the temperature of the stationary fuel cell stack. Further, the back pressure of the stationary fuel cell stack may be controlled by the method for controlling the pressure of the stationary fuel cell stack. Further, a supply quantity of the oxidizing agent (air, and the like)

and fuel supply apparatus such as a stationary fuel cell stack air blower, a reformer fuel and air blower, and a reformer burner fuel and air blower may be controlled by the method for controlling the fuel and oxidizing agent use rate of the stationary fuel cell stack. Further, the humidification quantity of the outlet gas of the humidifier attached to the fuel and oxidizing agent (air, and the like) of the stationary fuel cell stack and may be controlled by the method for controlling the humidity of the stationary fuel cell stack.

According to the exemplary embodiments of the present invention, the apparatus for managing a stationary fuel cell system, which is an independent component additionally mounted in the completed stationary fuel cell system, may have high compatibility, rapidly respond to the environmental information, such as the fuel cost, the fuel heating value, the fuel composition information, the discount rate of the fuel cost, the support fund for the fuel cost, the fuel fare system, and the electric cost which vary from hour to hour, thereby increasing the efficiency, and rapidly respond to the product information, such as the performance, efficiency, and lifespan of the component to present and control the optimal driving conditions, thereby increasing the efficiency of the stationary fuel cell system.

According to the exemplary embodiments of the present invention, the method for managing a stationary fuel cell system may rapidly respond to the environmental information, such as the fuel cost, the fuel heating value, the fuel composition information, the discount rate of the fuel cost, the support fund for the fuel cost, the fuel fare system, and the electric cost which vary from hour to hour, thereby increasing the efficiency, and rapidly respond to the product information, such as the performance, efficiency, and lifespan of the component to present and control the optimal driving conditions, thereby increasing the efficiency of the stationary fuel cell system.

Further, according to the exemplary embodiments of the present invention, the method for managing a stationary fuel cell system may rapidly respond to the environmental information, such as the fuel heating value and the fuel composition information which vary from hour to hour, thereby increasing the efficiency and rapidly respond to the product information, such as the performance, efficiency, and lifespan of the component, to present and control the optimal driving conditions, thereby increasing the efficiency of the stationary fuel cell system.

The present invention is not limited to the above-mentioned exemplary embodiments, and may be variously applied, and may be variously modified without departing from the gist of the present invention claimed, in the claims.

What is claimed is:

1. An apparatus for managing a stationary fuel cell system, comprising:
    a connection unit which is detachably connected to a control unit of a stationary fuel cell system;
    a collection unit which is connected to the connection unit to receive data of the stationary fuel cell system;
    a calculation unit which is connected to the collection unit to determine a method for controlling the stationary fuel cell system based on the received data; and a control unit which is connected to the calculation unit and the connection unit to control the stationary fuel cell system on the basis of the control method determined by the calculation unit,
    wherein the connection unit is directly connected to the control unit of the stationary fuel cell system and the collection unit and the control unit are connected to each other by a cable.

2. The apparatus of claim 1, wherein the collection unit collects at least one information selected from a flow rate of the fuel supplied to a reformer, a flow rate of the fuel supplied to a burner for the reformer, a voltage of the stationary fuel cell, a current for a stationary fuel cell, a flow rate of the fuel supplied to a fuel conversion system, power of the stationary fuel cell, temperature of the stationary fuel cell, pressure of the stationary fuel cell, a fuel and oxidizing agent use rate of the stationary fuel cell, humidity of the stationary fuel cell, a total power consumption of a balance of plant (BOP) of the stationary fuel cell, efficiency of DC/DC converter, efficiency of a DC/AC inverter device, a flow rate of a heat recovery fluid, water enthalpy of temperature of a hot water inlet, water enthalpy of temperature of a hot water outlet, an NG flow rate used in a home or a building as usages other than the fuel cell, and an electric load quantity required in a home or a building.

3. The apparatus of claim 1, wherein the calculation unit includes:
    a prediction unit which is connected to the collection unit to predict the performance of the stationary fuel cell system based on the received data; and
    a determination unit which is connected to the prediction unit to determine a method for driving the stationary fuel cell system based on the performance of the stationary fuel cell system, previously determined environmental information, and a previously determined driving purpose.

4. The apparatus of claim 3, wherein the determination unit includes:
    a product performance collection unit which is connected to the prediction unit to receive performance of the stationary fuel cell system;
    an environmental information collection unit which is connected to an external input device to receive at least one environmental information selected from fuel cost, electric cost, a fuel heating value, fuel composition information, a discount rate of the fuel cost, a support fund for the fuel cost, and a fuel fare system;
    a control method collection unit which is connected to the external input device to receive a driving purpose; and a driving method calculation unit which is connected to the product performance collection unit, the environmental information collection unit, and the control method collection unit to calculate the method for driving a stationary fuel cell system based on the performance, the environmental information, and the driving purpose of the stationary fuel cell system.

5. The apparatus of claim 1, further comprising:
    a display and control unit which is connected to the calculation unit, inputs the environmental information and the driving purpose to the calculation unit, and outputs the input environmental information and driving purpose.

6. The apparatus of claim 5, wherein the display and control unit is included in a managing unit which manages the stationary fuel cell system.

7. The apparatus of claim 5, wherein the driving purpose of the display and control unit is at least any one selected from electrical efficiency, heat efficiency, summing efficiency of electricity and heat, LNG operating cost efficiency, power operating cost efficiency, and summing efficiency of LNG operating cost and power operating cost.

8. The apparatus of claim 1, further comprising:
    a power supply unit which includes a battery for supplying power to supply power to the apparatus for managing a stationary fuel cell system.

9. The apparatus of claim 1, further comprising:
a data storage unit which is connected to the calculation unit to store all the data; and
a fuel cell analysis unit which is connected to the data storage unit to analyze the stationary fuel cell system so as to estimate characteristics of the stationary fuel cell system.

10. A method for managing a stationary fuel cell system of an apparatus for a stationary fuel cell system including a connection unit which is detachably connected to a control unit of a stationary fuel cell system, a collection unit, a calculation unit, and a control unit, the method comprising:
inputting product information to the collection unit through the connection unit and inputting environmental information to the calculation unit connected to an external input device;
determining, by the calculation unit, a method for controlling the stationary fuel cell system to increase driving efficiency or decrease driving cost by calculating a driving method depending on at least any one driving purpose selected from driving having electrical efficiency, driving having high heat efficiency, and driving having high overall efficiency which is a sum of the electrical efficiency and the heat efficiency or at least any one driving purpose selected from driving having low fuel used cost, driving having low electricity use cost, and driving having low total cost which is a sum of the fuel use cost and the electricity use cost, based on the product information and the environmental information input in the inputting of the information; and
controlling, by the control unit, the stationary fuel cell system on the basis of the control method determined by the determining of the control method.

11. The method of claim 10, wherein the product information of the inputting of the information is least one information selected from the flow rate of the fuel supplied to the reformer, the flow rate of the fuel supplied to the burner for the reformer, the voltage of the stationary fuel cell, the current for the stationary fuel cell, the flow rate of the fuel supplied to the fuel conversion system, the power of the stationary fuel cell, the temperature of the stationary fuel cell, the pressure of the stationary fuel cell, the fuel and oxidizing agent use rate of the stationary fuel cell, the humidity of the stationary fuel cell, the total power consumption of the balance of plant (BOP) of the stationary fuel cell, the efficiency of DC/DC converter, the efficiency of the DC/AC inverter device, the flow rate of a heat recovery fluid, the water enthalpy of temperature of the hot water inlet, the water enthalpy of temperature of the hot water outlet, the NG flow rate used in a home or a building as a usage other than the stationary fuel cell, and the electric load quantity required in a home or a building, and
the environmental information of the inputting of the information is at least any one selected from the fuel cost, the fuel heating value, the fuel composition information, the electric cost, the discount rate of the fuel cost, the support fund for the fuel cost, and the fuel fare system.

12. The method of claim 10, wherein the driving having high electrical efficiency is driving having highest electrical efficiency based on the following Formula $$\eta_p = \frac{3600 \times \left(W_{stack} - \frac{W_{BOP}}{E_{cov}}\right) E_{inv}}{F_{NG-in} \times K}$$

($\eta_p$ represents the electrical efficiency, $W_{stack}$ represents electric output (voltage×current) generated from the stationary fuel cell stack, $W_{BOP}$ represents a sum of the electric output (voltage×current) consumed from the balance of plant (BOP), $E_{cov}$ represents the efficiency of the DC/DC converter, $E_{inv}$ represents the efficiency of the DC/AC inverter, $F_{NG-in}$ represents the flow rate of the fuel supplied to the fuel conversion system, and K represents the fuel heating value).

13. The method of claim 10, wherein the driving having high heat efficiency is driving having highest heat efficiency based on the following Formula $$\eta_h = \frac{((i_2 - i_1)Q)}{F_{NG-in} \times K}$$

($\eta_h$ represents the heat efficiency, Q represents the flow rate of the heat recovery fluid, $i_1$ represents the water enthalpy of the temperature of the hot water inlet, $i_2$ represents the water enthalpy of the temperature of the hot water outlet, $F_{NG-in}$ represents the flow rate of the fuel supplied to the fuel conversion system, and K represents the fuel heating value).

14. The method of claim 10, wherein the driving having overall efficiency is driving having highest overall efficiency based on the following Formula $$\eta_{sfc} = \frac{\left(3600 \times \left(W_{stack} - \frac{W_{BOP}}{E_{cov}}\right) E_{inv}\right) + ((i_2 - i_1)Q)}{F_{NG-in} \times K}$$

($\eta_{sfc}$ represents the overall efficiency, $W_{stack}$ represents the electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{inv}$ represents the efficiency of the DC/AC inverter, Q represents the flow rate of the heat recovery fluid, $i_1$ represents the water enthalpy of the temperature of the hot water inlet, $i_2$ represents the water enthalpy of the temperature of the hot water outlet, $F_{NG-in}$ represents the flow rate of the fuel supplied to the fuel conversion system, and K represents the fuel heating value).

15. The method of claim 10, wherein the driving having low fuel use cost is driving having lowest fuel use cost based on the following Formula $$C_{NG-in} = UC_{NG}(F_{NG-1} + F_{NG-in})$$

($C_{NG-in}$ represents the fuel use cost, $UC_{NG}$ represents the fuel cost, $F_{NG-1}$ represents the flow rate of fuel used as the usage other than the stationary fuel cell, and $F_{NG-in}$ represents the flow rate of the fuel supplied to the fuel conversion system).

16. The method of claim 10, wherein the driving having low electricity use cost is driving having lowest electricity use cost based on the following Formula $$C_p = \left(UC_p \times \left(W_1 - \left(W_{stack} - \frac{W_{BOP}}{E_{cov}}\right) E_{inv}\right)\right)$$

($C_p$ represents the electricity use cost, $UC_p$ represents the electric cost, $W_1$ represents the electric load used as a usage other than the stationary fuel cell, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, and $E_{inv}$ represents the efficiency of the DC/AC inverter).

17. The method of claim 10, wherein the driving having low total cost is driving having lowest overall cost based on the following Formula $$C_{sfc} = \left(UC_p \times \left(W_1 - \left(W_{stack} - \frac{W_{BOP}}{E_{cov}}\right)E_{inv}\right)\right) + UC_{NG}(F_{NG-1} + F_{NG-in})$$

($C_{sfc}$ represents the total cost, $UC_P$ represents the electric cost, $W_1$ represents the electric load used as a usage other than the stationary fuel cell, $W_{stack}$ represents electric output (voltage×current) generated from the stationary fuel cell stack, $W_{BOP}$ represents the sum of the electric output (voltage×current) consumed from the balance of plant (BOP), $E_{cov}$ represents the efficiency of the DC/DC converter, $E_{inv}$ represents the efficiency of the DC/AC inverter, $UC_{NG}$ represents the fuel cost, $F_{NG-1}$ represents the flow rate of fuel used as the usage other than the stationary fuel cell, and $F_{NG-in}$ represents the flow rate of the fuel supplied to the fuel conversion system.

18. The method of claim 10, wherein the determining of the control method includes:
   predicting the performance of the stationary fuel cell system based on the product information input from the inputting of the information;
   calculating the driving method depending on at least one driving condition based on the performance of the stationary fuel cell system predicted in the predicting of the performance and the environmental information input in the inputting of the information; and
   determining at least one of the driving methods calculated in the calculating of the driving method.

19. The method of claim 10, wherein the determining of the control method includes:
   predicting the performance of the stationary fuel cell system based on the product information input in the inputting of the information;
   selecting and inputting a driving purpose using an external input device; and
   calculating the driving method based on the performance of the stationary fuel cell system predicted in the predicting of the performance, the environmental information input in the inputting of the information, and the driving purpose input in the inputting of the driving purpose.

* * * * *